Figure 1:
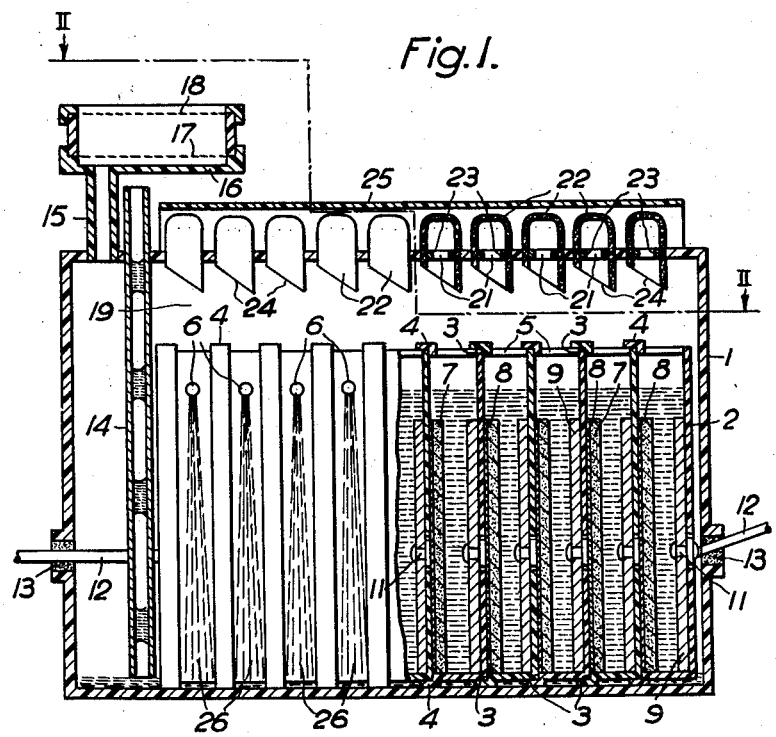

Aug. 27, 1963     K. JONES     3,102,058
INERT VOLTAIC BATTERIES

Filed Feb. 2, 1960

INVENTOR
Kenneth Jones
BY
ATTORNEY

3,102,058
INERT VOLTAIC BATTERIES
Kenneth Jones, Dundee, Scotland, assignor to Burndept Limited, London, England, a British company
Filed Feb. 2, 1960, Ser. No. 6,324
Claims priority, application Great Britain Feb. 10, 1959
2 Claims. (Cl. 136—90)

This invention relates to inert dry batteries intended to be made active by immersion in the sea and to be used submerged in a substantially upright position. A common use of such a battery is upon a buoy, and it is assumed that the object to which the battery is attached will maintain it in the intended position.

Batteries of this kind have been described which comprise a container having its lower part divided into water tight compartments open at the top and each containing a single cell. An outlet from the top of the container and an inlet tube opening at a lower level than the outlet and extending to the bottom of the container permit ready escape of air and filling of the container with water upon immersion. Thereafter generation of gas, either by the chemical activity of the cells or by substances within the container which generate gas on wetting, can cause expulsion of water from above the cells through the inlet tube if means are provided to close the outlet when the container is filled.

During operation such batteries are likely to lose electrolyte through evaporation and spraying. Also the electrolyte that is left decreases in hydrogen ion concentration, and interferes with the action of the cells by causing insoluble products to deposit on the electrodes.

To remedy this difficulty the present invention provides for the continuous admission of water to the battery at a rate greater than the rate of loss of evaporation and spraying and for the expulsion of the excess electrolyte. The cells are thereby kept always full of electrolyte and the hydrogen ion concentration is prevented from falling to a harmful extent.

Since the incoming water must not be allowed to form a short circuit across two or more cells within the container, nor to short-circuit the battery by connecting its poles to the sea and therefore to each other, it is necessary to provide for separate admission of water to each cell and to admit the water a drop at a time and not in a continuous stream.

Since each cell will continually overflow it is desirable to provide an overflow opening below the mouth of the cell compartment, and to form ribs on the outer surface of each compartment, so that the overflow from one cell cannot coalesce with the overflow from another as it descends, nor even when it reaches the bottom of the container, except along narrow channels which convey the liquid to the water inlet and gas escape tube. Thus any connection established by the overflow between one cell and another is a connection of great length and small cross-section and therefore of high resistance. Because the admission is dropwise no conductive path is formed by the incoming water between the battery and the sea. The inlet pipe is of small bore so that gas and liquid do not pass through it side by side; the excess liquid is expelled through the tube in beads separated by bubbles of gas, so that here also no conductive path to the sea is formed.

An example of a battery embodying the invention is illustrated diagrammatically in the accompanying drawings.

Figure 2:
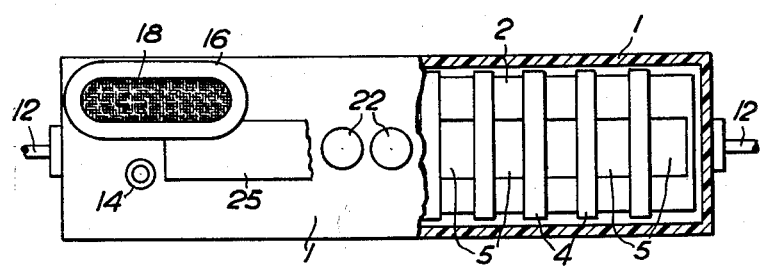

FIGURE 1 is a sectional elevation and
FIGURE 2 is a plan partly in section.

The battery container 1 may be of plastic. Its lower portion is divided into watertight compartments. In the construction shown this is accomplished by the provision of a battery casing built up of cell containers. Each cell container is a shallow tray 2, which in use stands on one edge. Each tray is formed with a shoulder 3 and an enlarged lip 4 within which the bottom of the next tray is received. The one tray fits within the lip 4 of its neighbour and abuts on the shoulder 3. The trays may conveniently be moulded of toughened polystyrene, and when assembled can be cemented together with benzene. In one edge of each tray, which becomes the top of the cell container, there is a wide opening 5. In another edge of the tray, which becomes a vertical wall of the cell container, there is a perforation 6 which serves as an overflow opening.

Before the trays 2 are assembled into a stack there are placed in each the constituents of a cell. In the example illustrated it is assumed that the cathode is a plate of silver chloride 7 to which a sheet of silver foil 8 is made to adhere by heating; the anode 9 is of magnesium; the cathode of one cell is joined to the anode of the next through a rivet 11 passing through the tray, soldered to the silver foil and clenched upon the magnesium 9. Connection is made from the battery to an external circuit by insulated leads 12 carried through waterproof seals 13 in the walls of the container 1.

When the container is immersed water is admitted to its interior through the tube 14 which projects from the top of the container and almost extends to the bottom of it. The tube is narrow; to enable water to enter by it the air in the container must be allowed to escape. For this purpose an outlet tube 15 is provided extending upwards from the top of the container to a greater height than the inlet tube 14. A valve or other means is provided to prevent escape through the outlet 15 of gas generated within the container after it has been filled with water. With the construction of cell above described hydrogen will be generated on the surface of the magnesium; if the cell constituents are not such as to produce sufficient gas for the operation next described gas-making ingredients may be included in the container to generate gas when wetted. In the example illustrated the outlet tube 15 opens into an enlargement 16 across which is stretched a porous membrane 17. This will allow ready exhaust of air so long as it is not wetted. To prevent it being wetted except from inside the battery container the mouth of the enlargement 16 is covered by a water repellent barrier 18 which will allow the passage of gas but will not permit the entry of water. The membrane 17 may be of filter paper, the diaphragm 18 of woven fabric impregnated with a silicone, or of unglazed ceramic, sintered metal or glass fibre fabric similarly treated with silicone.

When the battery container is immersed the air in it escapes through 15 and water enters through 14 filling the container to the level of the openings 6 in the cell containers 2 and then flowing into the cell containers through these openings, and finally filling the space 19 above the cells and rising through the outlet 15 into the enlargement 16 and wetting the membrane 17. Gas generated within the container will rise to the top of it but cannot escape through the wetted membrane 17; the gas pressure therefore expels water through the inlet pipe 14, and this continues until the battery container is nearly empty and the cell containers are filled only to the level of the perforations 6.

Continued action of the battery with evolution of gas will be accompanied by some loss of electrolyte through evaporation and spraying; and, as explained above, the pH in the cells will increase and the activity of the cells may be impaired.

To prevent this, provision is made for continuous admission of water. For this purpose a hole 21 is provided in the top of the battery container 1 above each cell of the battery. But water must not flow into the cells in continuous streams, for such streams would constitute a conductive connection between each cell and the open sea and therefore would short-circuit the battery. Admission of water must therefore be limited by capillary action. To this end, in the construction illustrated, there is fitted into each hole 21 a thimble 22 of filter paper or like porous material the top of which is below the level of the top of tube 14. This may be secured in place by rings 23, or merely fixed by waterproof adhesive. Water will slowly find its way through the thimbles and drop into the cells. There is a possibility of a thimble filling with water before any water drops, and thus a whole thimbleful falling at one time; this is undesirable; to prevent it the mouth of each thimble is cut at a slant, as seen at 24. Water soaking through the thimble runs down to the lowest point of the mouth, and so is directed precisely into the opening 5 below and caused to fall in separate drops. It is desirable to protect the thimbles 22 from mechanical damage by a cover 25 of channel section which may be integral with the battery container 1.

The entry of water through the thimbles 22 will cause a constant overflow of electrolyte through each perforation 6 as indicated at 26. If the overflow through one perforation 6 at once coalesced with the overflow from the next perforation 6 there would be a leakage of electric current and waste of energy. To prevent this the outside surface of the cell container is formed with vertical ribs on either side of the perforation 6 so confining the overflow to the space between the ribs. In the construction shown the lips 4 of the cell container form such ribs. Moreover when the overflow has reached the bottom of the battery container it still cannot coalesce into a sheet bcause the bottom of the battery container is divided by the lips 4 of the cell container. So it is only at the ends of the channels formed along the bottom of the battery container by the lips 4 of the cell containers that the films of electrolyte overflow from the several cells can unite. Thus, though a conductive path may possibly be established through the overflow from the cells it is a path of great length and small cross-section presenting considerable electrical resistance, and loss through leakage of current is small.

When the electrolyte accumulating in the bottom of the battery container 1 closes the mouth of the inlet tube 14, the pressure of the gas evolved will force the electrolyte into the tube 14; this will at once reduce the level of the liquid in the battery container and uncover the mouth of the tube 14 whereupon gas will enter the tube. The result is that the overflowing electrolyte leaves the battery container through the tube 14 in a succession of beads separated by bubbles of gas as indicated in FIG. 1 which shows roughly the condition of the battery while in use. Thus no conductive connection is established between the battery and the sea by the expelled electrolyte. Nor is any conductive connection established through the thimbles 22 provided they are sufficiently spaced above the liquid in the cells for each drop to fall freely.

While not essential, the thimble form of capillary entry is preferred because it best preserves its porosity. There is likely to be solid matter deposited on the capillary entry and in time it could become clogged. The thimble presents a considerable vertical surface on which there will be no deposit of solid matter through gravity alone. There may nevertheless be some deposit. But, in the condition of the battery indicated in FIG. 1, there will be some gas pressure within the container, enough at least to support the broken column of liquid in the tube 14. Moreover this pressure will be constantly varying as first a bead of liquid and then a bubble of gas enters the tube 14. This gas pressure will tend to expel liquid through the thimbles 22, and the minute reversal of flow through the thimble will tend to dislodge any solid matter accumulated on it. Gas cannot escape through the thimbles for the same reason that it cannot escape through the membrane 17 when the membrane is wet.

I claim:

1. An inert dry battery for activation by immersion in water in a substantially upright position comprising a generally closed battery container including a top having a vent therein and a bottom, at least one cell container within said battery container, the cell container having provision for overflow down to an overflow level below the top of said battery container, a duct extending from above the top of the battery container down to a point within the battery container outside the cell container and below said overflow level, said duct serving as an inlet for water when the battery is first immersed and subsequently as an outlet for excess gas and liquid, a plurality of elements at least partly within each cell container and wholly within the space enclosed by the battery container which when water is added to the battery container and to each cell container constitute a voltaic cell within the cell container and also cause gas to be generated in the space enclosed by the battery container, means for automatically closing said vent when the battery container is filled with water, the gas then generated causing liquid and gas to be discharged through said duct until the level of the liquid in each cell container falls to said overflow level and the level in the battery container falls to the level of the point down to which said duct extends, and means for admitting water drop by drop into each cell container from the water in which the battery is immersed.

2. An inert dry battery for activation by immersion in salt water in a substantially upright position comprising a generally closed battery container including a top having a vent therein and a bottom, a plurality of cell containers within said battery container each having a wide opening at its upper end spaced below the top of said battery container and having an overflow opening a little below its upper end, a duct extending from above the top of the battery container down to a point within the battery container outside said cell containers and below the level of the overflow openings in said cell containers, said duct serving as an inlet for water when the battery is first immersed and subsequently as an outlet for excess gas and liquid, a plurality of elements within each cell container which when salt water is added to the container, constitute therein a voltaic cell and also generate gas, a porous membrane across said vent which when dry permits the passage of gas but when wet prevents the passage of gas, a water repellent barrier to permit the passage of gas located outside said membrane to prevent access of water to the membrane from outside the battery container when the battery is immersed, said membrane thus becoming wet after the battery is immersed only when the battery container fills sufficiently for water to reach the membrane from the inside of the battery container and thereafter preventing the escape of gas through the vent and the pressure of the gas generated by the access of the water to said elements then causing liquid and gas to be discharged through said duct until the level of liquid in the cell containers falls to the level of the overflow opening and the level of the liquid in the battery container falls to the level of the point down to which said duct extends, a plurality of thimbles of porous material with one for each cell container and traversing the top of the battery container to come into contact with the water outside the battery when immersed, the lower end of each thimble being sloped at an angle and having its lower end located above the wide opening in the upper end of the respective cell container, connections electrically interconnecting the several cells without permitting the passage of liquid from one cell container to another, and end connections from the battery leading to the outside of the battery.

References Cited in the file of this patent
UNITED STATES PATENTS

| | | |
|---|---|---|
| 396,329 | D'Humy | Jan. 15, 1889 |
| 2,939,900 | Jones et al. | June 7, 1960 |